United States Patent
Boerhout et al.

(10) Patent No.: US 6,199,422 B1
(45) Date of Patent: Mar. 13, 2001

(54) METHOD AND SYSTEM FOR FAST PROBE FAILURE DETERMINATION

(75) Inventors: Johannes I. Boerhout, La Mesa; Phillip L. Maness, El Cajon; Hoa Nguyen; Wane D. Wier, both of San Diego, all of CA (US)

(73) Assignee: SKF Condition Monitoring, Inc., San Diego, CA (US)

( * ) Notice: Subject to any disclaimer, the term of this patent is extended or adjusted under 35 U.S.C. 154(b) by 0 days.

(21) Appl. No.: 09/056,157

(22) Filed: Apr. 6, 1998

Related U.S. Application Data (60) Provisional application No. 60/054,095, filed on Jul. 29, 1997.

(51) Int. Cl.[7] ....................................... G01H 1/00
(52) U.S. Cl. .............................................. 73/1.82
(58) Field of Search ........................... 73/658–661, 1.82, 73/1.84, 1.85; 367/13; 340/683, 679; 364/508

(56) References Cited

U.S. PATENT DOCUMENTS

| 4,278,872 | 7/1981 | Koether et al. . |
| 4,797,670 | 1/1989 | Joyner . |
| 4,821,528 | 4/1989 | Tershak . |
| 5,223,207 | 6/1993 | Gross et al. . |

FOREIGN PATENT DOCUMENTS

| 0 496 333 A1 | 7/1992 | (EP) . |
| 0 537 041 A1 | 4/1993 | (EP) . |
| 0 541 326 A2 | 5/1993 | (EP) . |
| WO 97/03385 | 1/1997 | (WO) . |

OTHER PUBLICATIONS

Clarke, D.W., "Sensor, Actuator and Loop Validation," IEEE publication, pp. 761–766, Aug. 24, 1994.

Ray, Askos, "A Microcomputer–Based Fault–Tolerant Control System for Industrial Applications," IEEE publication, pp. 1276–1283, Sep.–Oct., 1985.

Primary Examiner—Robert Raevis
(74) Attorney, Agent, or Firm—Knobbe, Martens, Olson & Bear, LLP (57) ABSTRACT

A method and system for monitoring the operational condition of a machine is disclosed. The system includes: a test probe configured to be coupled to the machine for measuring an operational parameter of the machine and for outputting a test signal representative of the measured operational parameter; a fault condition detection circuit, coupled to the test probe, for receiving and processing the test signal so as to detect a fault condition of the machine; a probe failure detection circuit, coupled to the test probe, for receiving the test signal and detecting a failure condition of the test probe if the test signal is not within defined limits, wherein the probe failure detection circuit provides a data path that is separate from the fault condition detection circuit; and a processor, coupled to the fault condition detection circuit and the probe failure detection circuit, for initiating a defined action in response to signals received from the fault condition detection circuit and the probe failure detection circuit. The method includes the following acts: measuring an operational parameter of the machine with a probe coupled to the machine; outputting a test signal representative of the measured operational parameter; providing the test signal to a machine fault detection circuit for processing; determining whether the test signal indicates that a machine fault condition exists; providing the test signal to a probe failure detection circuit; determining whether the test signal indicates a probe failure condition exists, wherein the probe failure detection circuit operates independently of the machine fault detection circuit; and initiating a defined action if it is determined that a machine fault condition exists and a probe failure condition is not detected.

31 Claims, 5 Drawing Sheets

METHOD AND SYSTEM FOR FAST PROBE FAILURE DETERMINATION

RELATED APPLICATIONS

This application claims priority from a co-pending and commonly-owned U.S. provisional patent application entitled, "Fast Probe Failure Determination," U.S. Ser. No. 60/054,095, and filed on Jul. 29, 1997.

BACKGROUND OF THE INVENTION

1. Field of the Invention

The invention relates to monitoring probes. More particularly, the invention relates to determining a status condition of vibration monitoring probes.

2. Description of the Related Technology

Machinery used in manufacturing facilities and power generating stations, for instance, employ vibration monitoring equipment to detect variations in their vibration characteristics. By careful monitoring, a company may determine appropriate intervals for machine maintenance and obtain indications of imminent machine failures. Naturally, the proper scheduling of maintenance improves the operating efficiency of a facility.

Furthermore, by measuring specific parameters associated with a machine, a company may assess its operating conditions to predict the failure of components before it occurs.

By providing a warning of imminent machine failure, a company can avoid catastrophic machine damage as well as danger to facility personnel. Additionally, by monitoring the efficiency and operation of machinery used in manufacturing and process plants, for example, a company may achieve a competitive advantage by reducing unscheduled machine downtime, reducing repair times and optimizing machinery performance.

With many current monitoring systems, the concept is to measure and monitor operational parameters, such as vibration levels, of a given machine, and shut the machine down via a relay actuation if the measured parameters exceed user-determined set points. Each industry recognizes the need for this type of protection, and many have developed standards which establish electromechanical requirements for the systems and equipment used to monitor machinery. Such requirements include maximum times to detect a machine fault condition, optimal levels and tolerances for power supply inputs and outputs, system inputs and outputs, and so forth.

One of the most stringent of the electromechanical standards for vibration monitoring equipment is the American Petroleum Institute (API) Standard 670, Third Edition. And more specifically, one area within this standard where the current technology is inadequate is in meeting fault condition detection timing requirements. API 670, $3^{rd}$ Edition, Paragraph 3.5.1.1.p states "The time required to detect and initiate an alarm (alert) or a shutdown (danger) shall not exceed 100 milliseconds." By this standard, therefore, an almost immediate alarm and/or shutdown is required if vibrational data indicates faulty machine operation.

The prescribed time limits must be met not only for alarm and shutdown but also to validate the data so as to verify its accuracy and reliability. One process of validating the data involves determining if a probe is in proper working condition. If it is not, data received from the probe may be inaccurate, leading to an incorrect evaluation of a machine being tested. In such a case, the machine may be unnecessarily shut down, or alternatively, the machine which is on the brink of breakdown may be allowed to continue operating, ultimately leading to a fatal failure of the machine. Validating the test data avoids false alarms and unnecessary machine shutdowns and/or catastrophic breakdowns.

Current technology typically determines whether the probe is functioning properly by processing data received from the normal data acquisition path used for evaluating the status of the machine being tested. One inadequacy of this method is that the data flow paths for normal data acquisition and probe failure detection are the same, i.e., the analog input signals are first conditioned, multiplexed, converted to a digital equivalent value, and finally received by the digital circuitry, prior to any determination of whether the probe is in a proper working state. Thus, any delays introduced to the normal data acquisition time are introduced to the probe failure detection time as well. Additionally, the delay introduced by a given system is not always the same, and thus the probe failure detection time can vary from one event to the next, making compliance with real-time detection needs extremely difficult.

Therefore, a method and system is desired to provide an early detection of whether the monitoring probe is in proper working condition and providing an early warning, e.g., a probe failure signal, if it is determined that the monitoring system has a faulty probe. Furthermore, a method and system is needed to determine the operational status of the probe prior to completion of the processing of test data received by the probe. In this way, any alarm or shutdown which may be initiated by test data received by the probe is not further delayed by an amount of time required to determine the operational status of the probe. Furthermore, by detecting a faulty probe prior to the completion of the conditioning and processing of vibration data, false alarms and/or unnecessary machine shutdowns are avoided.

SUMMARY OF THE INVENTION

The present invention addresses the above and other needs by providing a probe failure detection circuit that is separate and independent of the circuit used to detect a machine fault condition. The invention eliminates or substantially reduces delays associated with prior art probe failure detection. The determination of the operational status of the probe is generally completed prior to the completion of the processing of the test data.

In one embodiment of the invention, a system for monitoring the operational condition of a machine, includes: a test probe, capable of connecting to the machine, outputting a test signal representative of an operational parameter of the machine; a fault condition detection circuit receiving and processing the test signal so as to detect a fault condition of the machine; and a probe failure detection circuit receiving the test signal and detecting a failure condition of the test probe if the test signal is not within defined limits, wherein the probe failure detection circuit provides a data path that is separate from the fault condition detection circuit.

In another embodiment, a circuit for detecting a failure condition of a probe used for measuring operational parameters of a machine, includes: a first comparator comparing a test signal received from the probe to an upper limit voltage received from an upper limit voltage source; a second comparator comparing the test signal to a low reference voltage received from a low reference voltage source, wherein the first and second comparators are configured to cooperatively output a redundancy signal if the test signal is greater than the upper limit voltage or less than the low reference voltage; and a third comparator, having a first input coupled to respective outputs of the first and second comparators and a second input coupled to a third reference voltage source, comparing the redundancy signal to a third reference signal provided by the third reference voltage source, and outputting an interrupt signal if the redundancy signal is at a defined level with respect to the third reference signal, wherein if the redundancy signal and the interrupt signal are both at defined voltage levels, a probe failure condition is detected.

In a further embodiment, a system for monitoring the operational condition of a machine, includes: probe means, configured to be coupled to the machine, for measuring an operational parameter of the machine and for outputting a test signal representative of the measured operational parameter; machine fault detection means, coupled to the probe means, for receiving and processing the test signal so as to detect a fault condition of the machine; probe failure detection means, coupled to the probe means, for receiving the test signal and detecting a failure condition of the probe means if the test signal is not within defined limits, wherein the probe failure detection means operates independently of the machine fault detection means; and processor means, coupled to the machine fault detection means and the probe failure detection means, for initiating a defined action in response to signals received from the -Machine fault detection means and the probe failure detection means.

In yet another embodiment, a circuit for detecting a failure condition of a probe used for measuring operational parameters of a machine, includes: first comparator means, coupled to the probe, for comparing a test signal received from the probe to a upper limit voltage received from a upper limit voltage source; second comparator means, coupled to the probe, for comparing the test signal to a low reference voltage received from a low reference voltage source wherein the first and second comparator means are configured to cooperatively output a redundancy signal if the test signal is greater than the upper limit voltage or less than the low reference voltage; and third comparator means, coupled to respective outputs of the first and second comparator means, for comparing the redundancy signal to a third reference voltage provided by a third reference voltage source, wherein if the redundancy signal is at a defined level with respect to the third reference voltage, the third comparator means outputs an interrupt signal and the probe failure is detected.

In a further embodiment of the invention, a method of monitoring the operational condition of a machine, includes: measuring an operational parameter of the machine with a probe coupled to the machine; outputting a test signal representative of the measured operational parameter; providing the test signal to a machine fault detection circuit for processing; determining whether the test signal indicates that a machine fault condition exists; providing the test signal to a probe failure detection circuit; determining whether the test signal indicates a probe failure condition exists, wherein the probe failure detection circuit operates independently of the machine fault detection circuit; and initiating a defined action if it is determined that a machine fault condition exists and a probe failure condition is not detected.

In another embodiment, a method of detecting a failure condition of a probe used for measuring operational parameters of a machine, includes: comparing a test signal received from the probe to a upper limit voltage received from a upper limit voltage source; comparing the test signal to a low reference voltage received from a low reference voltage source; providing a redundancy signal if the test signal is greater than the upper limit voltage or less than the low reference voltage; comparing the redundancy signal to a third reference voltage provided by a third reference voltage source; and providing an interrupt signal, if the redundancy signal is at a defined level with respect to the third reference voltage, wherein the presence of both the redundancy signal and the interrupt signal indicates a probe failure condition.

DETAILED DESCRIPTION OF THE PREFERRED EMBODIMENTS

Preferred embodiments of the present invention will now be described with reference to the accompanying Figures, wherein like numerals refer to like elements throughout. The terminology used in this description is intended to be interpreted in its broadest reasonable manner, even though it is being utilized in conjunction with a detailed description of certain specific preferred embodiments of the present invention.

Figure 1:
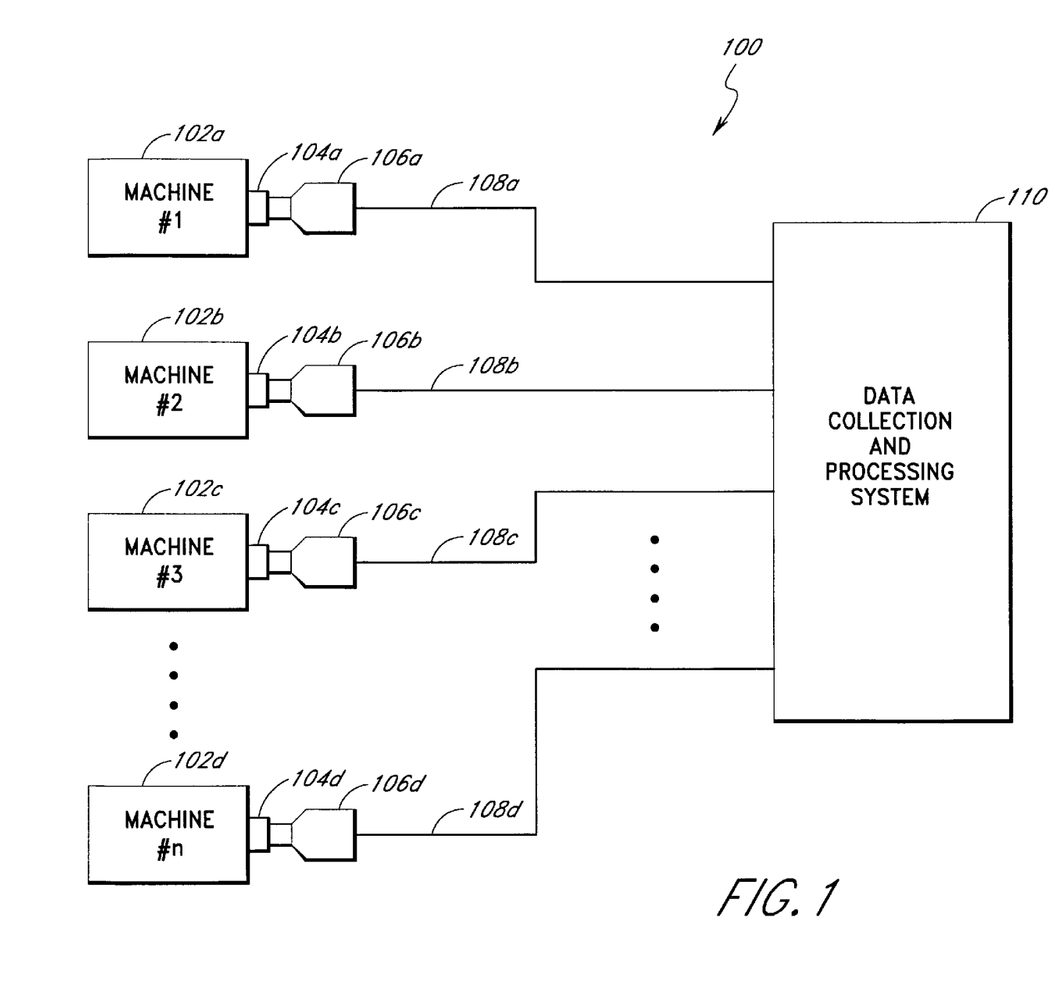
FIG. 1 is a block diagram of a monitoring system that monitors operational parameters for a plurality of machines.

FIG. 1 illustrates a block diagram of a monitoring system 100 which monitors the operational status of a plurality of machines 102a, 102b, 102c, 102d. Any number of machines "h" may be monitored by the system 100. The machines 102 may be part of a single facility such as a manufacturing plant or may comprise machinery for distinct facilities which may be geographically distant from one another. Additionally, the monitoring system 100 may be used to monitor a single machine 102. Thus, it is understood that the monitoring system and method of the invention is not limited to any particular configuration of machinery.

The machines 102 are commonly monitored for their vibration level. However, it is understood that the invention is not limited to the measurement of any single type of operational parameter. Other parameters such as temperature, pressure, etc., may also be monitored in accordance with the invention. For purposes of discussion, however, the following description focuses on the monitoring of vibration levels.

The moving and/or rotating components of a machine 102 produce characteristic vibrations. These vibrations may be communicated to one or more vibration coupling studs 104a, 104b, 104c, 104d secured to the housing of the machine 102 by, for example, a threaded connection into the machine housing. The vibration coupling studs 104 may be secured to a machine housing or other integral part of the machine 102, thereby coupling vibrations of the entire machine 102 to the vibration monitoring system 100. One will appreciate that the machine may be any type of device with moving parts, including a turbine, pump, fan, or the like, for which condition monitoring is advantageous.

Each vibration coupling stud 104 provides a location which is adapted to accept a respective probe 106a, 106b, 106c, 106d for measuring the vibrations of the machine 102. The probe 106 typically includes a vibration transducer (not shown), such as a piezoelectric crystal, which is in mechanical contact with a portion of the probe 106 that engages the coupling stud 104. When the probe 106 is placed in contact with the vibration coupling stud 104, the vibration is mechanically transferred to the transducer inside the probe 106 to produce an electrical test signal for analysis This test signal is typically an analog signal having a frequency proportional to the frequency of the vibrations being measured and an amplitude proportional to the magnitude of the measured vibrations. The operation and functionality of probes such as probe 106 are well-known in the art and, therefore, the internal engineering of the probe 106 is not discussed here.

Figure 2:
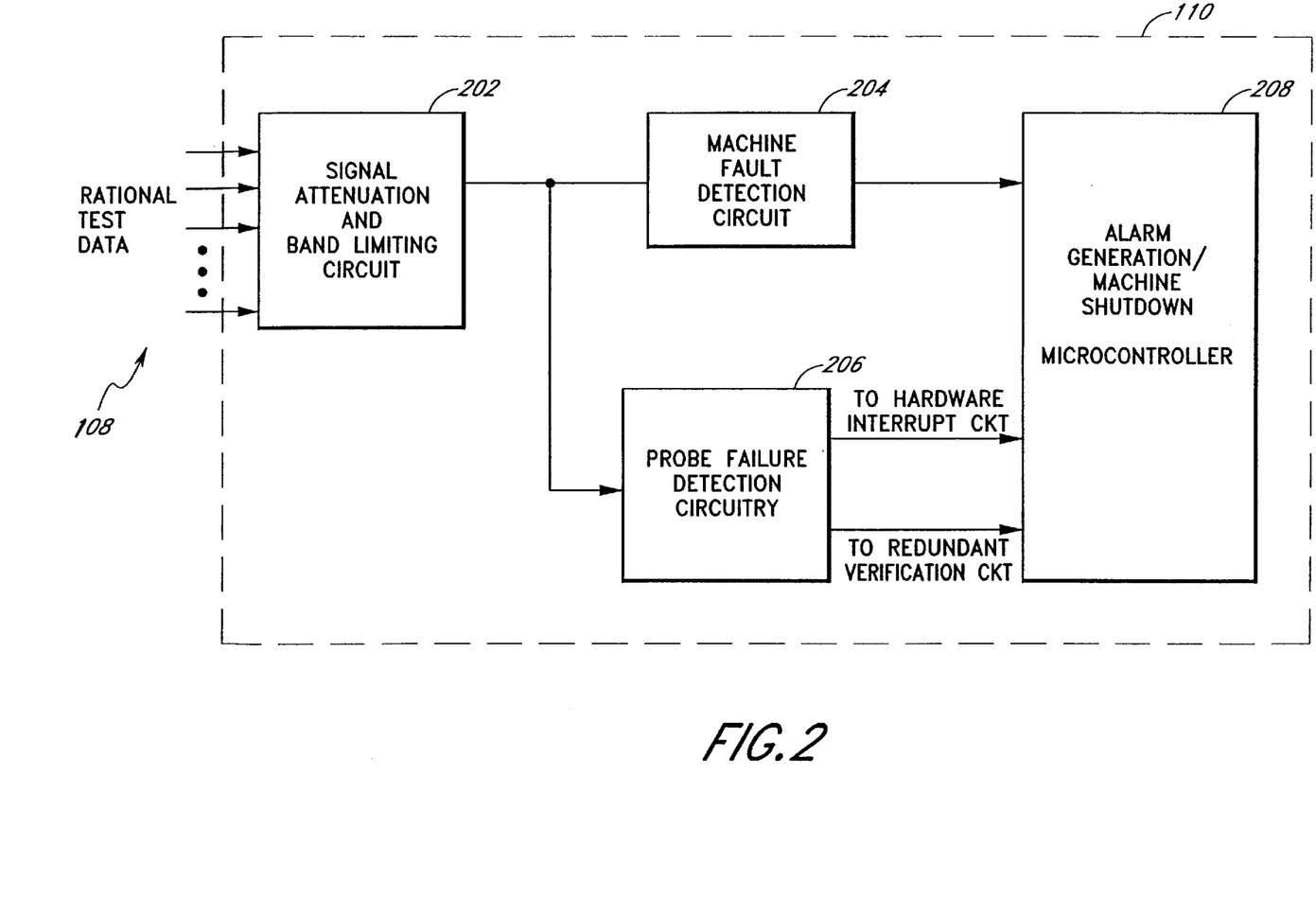
FIG. 2 is block diagram illustrating more detail of the data collection and processing system of FIG. 1, in accordance with one embodiment of the invention.

The test signal produced by each probe 106 is then transmitted along a respective communications line 108a, 108b, 108c, 108d to a data collection and processing system 110 which receives and processes the signal to determine whether a machine fault condition is present. FIG. 2 is a block diagram illustrating certain components of the data collection and processing system 110 of FIG. 1. The data collection and processing system 110 includes a signal attenuation/bandlimiting circuit 202 which receives test signals from one or more probes 106 (FIG. 1) via the communication links 108. In one embodiment, multiple signals from multiple probes 106 are multiplexed through the attenuation/bandlimiting circuit 202 so as to provide a distinct test signal from each of the multiple probes 106 shown in FIG. 1. The attenuation/bandlimiting circuit 202 filters the received test signals so as to remove spurious noise and interference components from each of the test signals and can be designed to allow only a specified range of frequencies and amplitudes to pass through. Such circuits are well-known in the art.

The data collection and processing circuit 110 further includes a machine fault detection circuit 204 which receives filtered test signals from the attenuation/bandlimiting circuit 202 to perform specified signal processing operations on the test signals. Such processing operations include analog to digital conversion of the test signals and analysis of the digitized test signal to determine whether a machine fault has occurred. For example, if the test signal indicates that the magnitude and/or frequency of the measured vibrations of a machine are too large, a machine fault condition is detected. In response, the machine fault detection circuit 204 transmits a fault condition signal to an alarm generation/machine shutdown microcontroller 208, which then generates an alarm to alert appropriate personnel of the machine fault condition and/or initiates a shutdown of the machine for which the fault condition has been identified, A more detailed description of the operation and functionality of the machine fault detection circuit 204 and the alarm generation/machine shutdown microcontroller 208 is provided in a copending, commonly-owned, U.S. patent application, entitled, "Vibration Data Processor and Processing Method," U.S. application Ser. No. 09/056,155, concurrently filed herewith, and incorporated herein by reference However, it is understood that both the fault detection circuit 204 and the alarm generation/machine shutdown microcontroller 208 may be any type of well-known processor capable of receiving and processing digital and/or analog data.

The data collection and processing circuit 110 further includes a probe failure detection circuit 206 which receives test signals from the signal attenuation/bandlimiting circuit 202 and determines if the test signal is within specified levels. For example, if the voltage level of the test signal is not within a specified voltage range, the probe failure detection circuit 206 determines that a probe failure has occurred. If a probe failure is detected, the probe failure detection circuit 206 transmits an interrupt signal 210 to the alarm generation/machine shutdown microcontroller 208 which interrupts the microcontroller 208 from generating an alarm and/or initiating a machine shutdown.

In one embodiment, the probe failure detection circuit 206 further transmits a redundancy verification signal 212 to the microcontroller 208 if a probe failure has been detected. The purpose of the redundancy verification signal 212 is to validate the interrupt signal 210 and ensure that the interrupt signal 210 is not the result of noise or interference signals, for example, affecting the probe failure detection circuit 206. It is unlikely that a random noise and/or interference signal would simultaneously cause both the interrupt signal 210 and the redundancy verification signal 212 to indicate a probe failure. Therefore, by requiring both signals, 210 and 212, to satisfy predetermined criteria, a control against random noise, interference, or "glitches" in the circuitry of the probe failure detection circuit 206 is established. The operation of the probe failure detection circuit 206 and the generation of the interrupt signal 210 and the redundancy verification signal 212 is described in further detail below with respect to FIG. 3.

Figure 3:
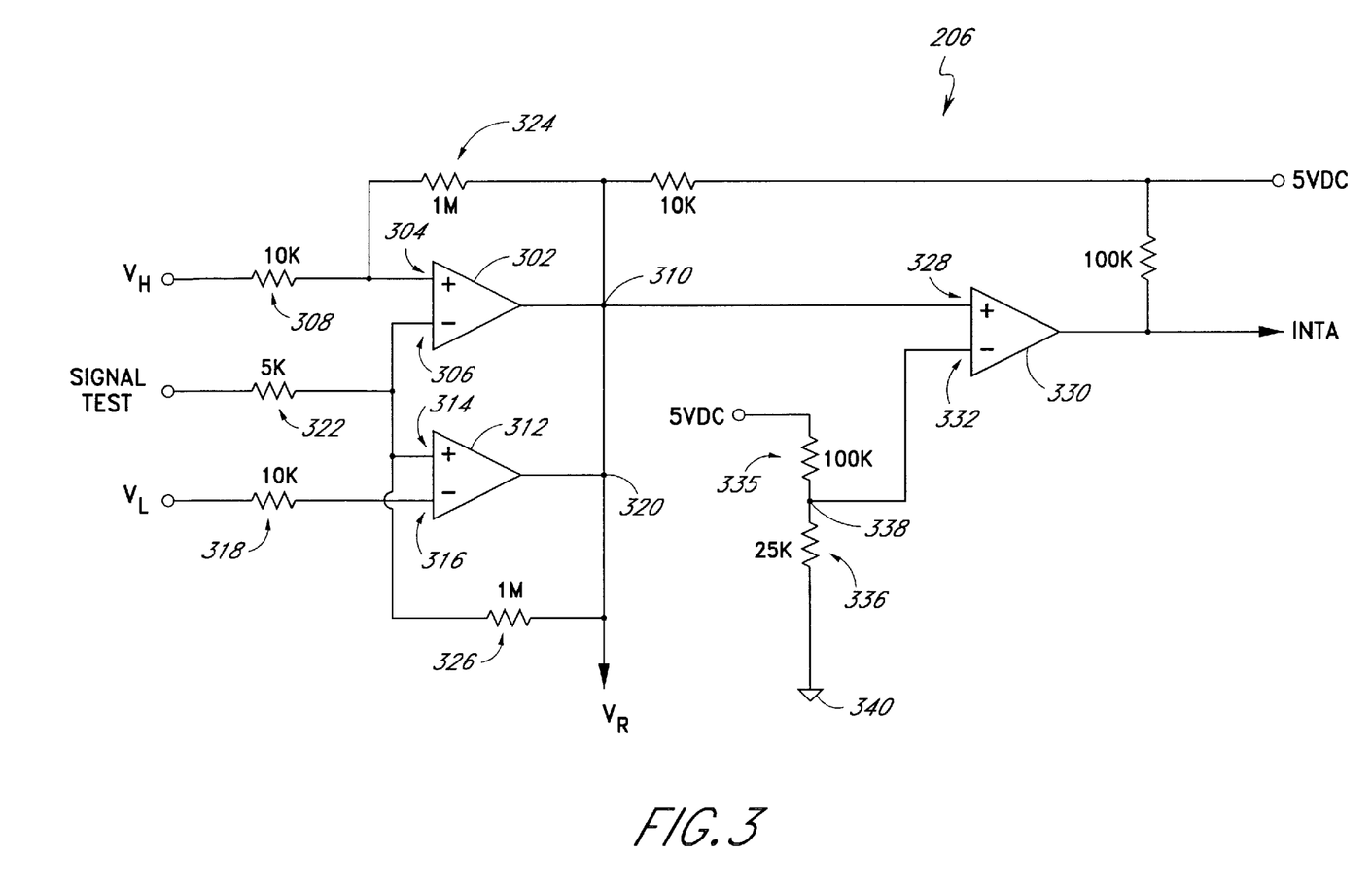
FIG. 3, is a schematic diagram of the probe failure detection circuit shown in FIG. 2, in accordance with one embodiment of the invention.

FIG. 3 is a schematic diagram of one embodiment of the probe failure detection circuit 206 of FIG. 2. The probe failure detection circuit 206 includes a first comparator 302 having a first input 304 and a second input 306. The first input 304 of the comparator 302 is connected to a first lead of a first voltage divider resistor 308. A second lead of the first voltage divider resistor 308 is connected to a high reference voltage source (not shown) which provides a high reference voltage ($V_H$) to the first voltage divider resistor 308. As explained in further detail below, the high reference voltage is adjusted by the voltage across the first voltage divider resistor 308 before it is applied to the first input 304 of the first comparator 302. This adjusted high reference voltage, or upper limit voltage, is used to determine whether the test signal received from the attenuation/bandlimiting circuit 202 (FIG. 2) indicates a probe failure.

The second input 306 of the first comparator 302 is connected to a first lead of a second voltage divider resistor 322. A second lead of the second voltage divider resistor 322 is coupled to the attenuation/bandlimiting circuit 202 (FIG. 2) to receive test signals therefrom. As explained in further detail below, the second voltage divider resistor 322 adjusts the voltage level of the test signal in response to a feedback signal received from the outputs of the first and second comparators 302 and 312, respectively, providing an adjusted input signal. If the voltage of the adjusted input signal exceeds the upper limit voltage provided to the first input 304, an output 310 of the first comparator 302 goes low. A low signal at the output 310 of the first comparator 302 provides a first redundancy signal which is used to determine whether a probe failure has occurred.

The failure detection circuit 206 further includes a second comparator 312 having a first input 314 and a second input 316. The first input 314 of the second comparator 312 is also connected to the first lead of the second voltage divider resistor 322. Therefore, the adjusted input signal is also received by the first input 314 of the second comparator 312.

The second input 316 of the second comparator 312 is connected to a lead of a series resistor 318. Another lead of the series resistor 318 is coupled to a low reference voltage source (not shown) that provides a low reference voltage ($V_L$) to the series resistor 318. This low reference voltage provides a lower limit voltage to the second input 316 of the second comparator 312 which is used to determine whether a probe failure has occurred. As explained in further detail below, if the voltage level of the adjusted input signal is below the lower limit voltage, the output 320 of the second comparator 312 goes low. A low signal at the output 320 of the second comparator 312 provides a second redundancy signal which is used to determine whether a probe failure has occurred As discussed above, the test signal is received from the attenuation/bandlimiting circuit 202 (FIG. 2) at the second lead of the second voltage divider resistor 322 having a first lead coupled to both the second input 306 of the first comparator 302 and the first input 314 of the second comparator 312. The functionality of the second voltage divider resistor 322 is described in further detail below.

The first input 304 of the first comparator 302 is a "positive" input and the second input 306 of the first comparator 302 is a "negative" input. Therefore, if the magnitude of a signal received at the second input 306 is less than the magnitude of the voltage received at the first input 304 of the first comparator 302, the signal at the output 310 of the first comparator 302 is a logic level high. However, if the magnitude of the signal at the second input 306 is greater than the magnitude of the signal received at the first input 304, the signal at the output 310 of the first comparator 302 is a logic-level low. Similarly, the first input 314 of the second comparator 312 is a "positive" input and the second input 316 is a "negative" input. Therefore, if the magnitude of a signal received at the first input 314 is greater than the magnitude of a signal received at the second input 316, the signal at the output 320 of the second comparator 312 will be a logic-level high. If the magnitude of the test signal received at the first input 314 is smaller than that of the signal received at the second input 316, the signal at the output 320 of the second comparator 312 will be a logic-level low. As is well-known in the electronics art, if the magnitude of a signal received at the positive input of a comparator is greater than the magnitude of a signal received at the negative input of the comparator, the output of the comparator will be a logic-level high signal. Conversely, if the signal at the negative input is greater than the signal at the positive input, the output will be low.

As used herein, the terms "low," "low level," and "logic-level low," refer to any defined or specified magnitude of a signal which may be used to designate one of two states or conditions. Similarly, the terms "high," "high level," and "logic-level high" refer to any defined or specified magnitude of a signal which is greater than that of a "low" signal and used to designate one of two states or conditions that is opposite a state or condition designated by a low signal.

As shown in FIG. 3, the output 310 of the first comparator 302 is tied to the output 320 of the second comparator 312. In this configuration, the first and second comparators, 302 and 312, respectively, cooperatively function to determine whether an adjust input signal falls between the upper and lower limit voltages. If the adjusted input signal is not within this window of acceptable voltages, either the first or second comparator, 302 or 312, indicates a failure condition. If the output 310 or 320 of either the first or second comparator, 302 or 314, respectively, goes low (indicating a failure condition), the output of the other comparator is also pulled low. The operation and functionality of window comparators such as that described above is well-known in the art.

The probe failure detection circuit 206 further includes a first feedback resistor 324 having a first lead coupled to the output 310 of the first comparator 302 and a second lead coupled to the first input 304 of the first comparator 302. The first feedback resistor 324 and the first voltage divider resistor 308 together form a feedback circuit which serves to control the level of the upper limit voltage ($V_{UL}$) at the first input 304 of the first comparator 302. This upper limit voltage varies as a function of the output of the first comparator 302 and is governed by the following equation referred to herein as Equation 1:

$$V_{UL}=V_H+[R_{d1}(V_R-V_H)/(R_{d1}+R_{f1})] \quad\quad\quad\text{(Eq. 1)}$$

where $V_{UL}$ is the upper limit voltage at the first input 304, $R_{d1}$ is the resistance of the first voltage divider resistor 308, $R_{f1}$ is the resistance of the first feedback resistor 324, $V_R$ is the voltage present at the output 310 of the first comparator 302 and $V_H$ is the high reference voltage provided by the high reference voltage source (not shown) connected to the first voltage divider resistor 308.

As an example, let $V_H$ equal 4 Volts DC, $R_{d1}$ equal 10 k Ohms and $R_{f1}$ equal 1M Ohms. Thus when the output $V_R$ of the first comparator is high (e.g., 5 Volts DC) the voltage $V_{UL}$ at the first input 304 of the first comparator 302 is approximately 4.01 Volts. When the output $V_R$ is low (e.g. 0 Volts), the voltage $V_{UL}$ is approximately 3.84 Volts. This variation of 3.84 to 4.01 Volts in the upper limit voltage provided to the first input 304 of the first comparator 302 is known in the electronic arts as a deadband. Voltage fluctuations in this deadband will not effect the output of the first comparator 302. The functionality of this upper deadband is described in further detail below with respect to FIG. 4.

The probe failure detection circuit 206 further includes a second feedback resistor 326 having a first lead coupled to the output 320 of the second comparator 312 and a second lead coupled to the first input 314 of the second comparator 312. The second feedback resistor 326 and the second voltage divider resistor 322 comprise a feedback circuit that serves to control the voltage level of the adjusted input signal at the second input 306 of the first comparator 302 and at the first input 314 of the second comparator 312. The adjusted input signal ($V_A$) varies as a function of the output of the first and second comparators 302 and 312, respectively, and is governed by the following equation referred to herein as Equation 2:

$$V_A=V_{TI}+[R_{d2}(V_R-V_{TI})/(R_{d2}+R_{f2})] \quad\quad\quad\text{(Eq. 2)}$$

where $V_A$ is the voltage of the adjusted input signal, $R_{d2}$ is the resistance of the second voltage divider resistor 322, $R_{f2}$ is the resistance of the second feedback resistor 326, $V_R$ is the voltage present at the output 320 of the second comparator 312 and $V_{TI}$ is a voltage level of the test signal received at the first lead 321 of the second voltage divider resistor 322 prior to being adjusted by the feedback circuit.

Figure 4:
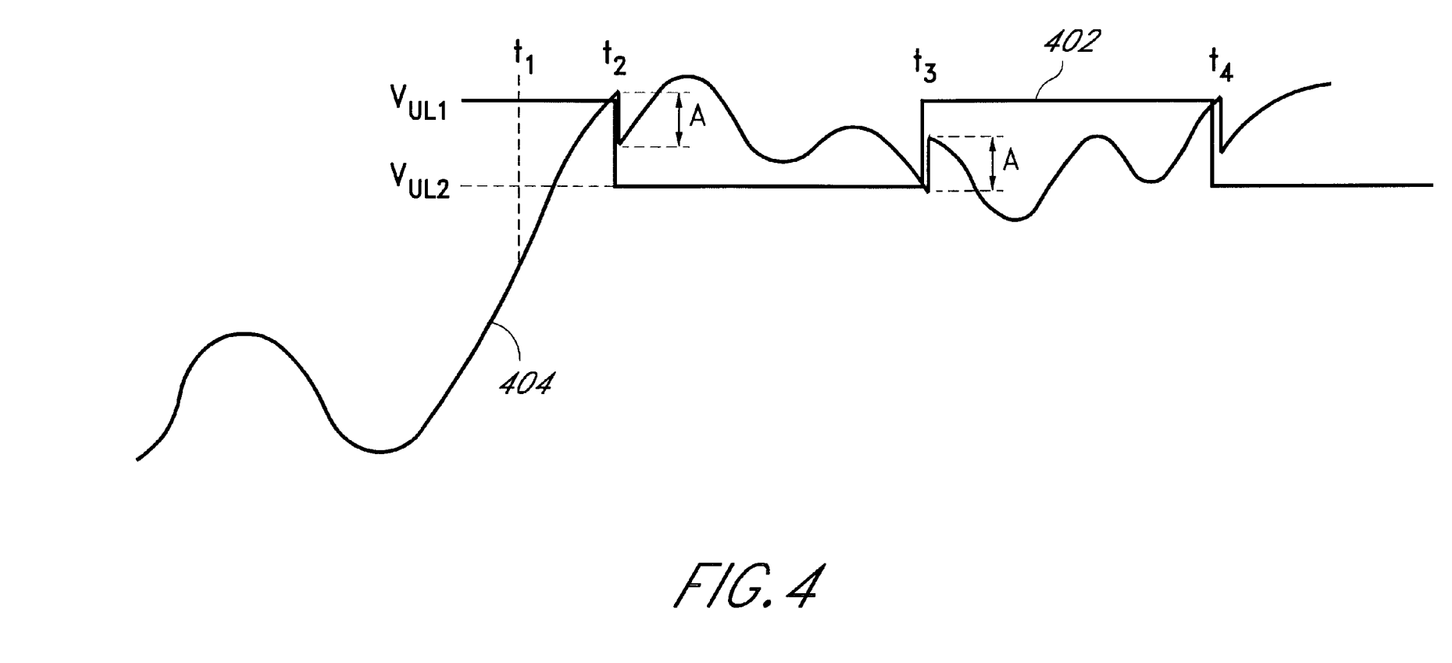
FIG. 4 is a signal diagram illustrating an upper limit voltage signal and a test signal received by the probe failure detection circuit of FIG. 3 as the magnitude of the test signal changes with respect to the upper limit voltage signal.

Referring to FIG. 4, a signal diagram illustrating the variation of the upper limit voltage signal 402 at the first input 304 of the comparator 302 and the variation of a adjusted input signal 404 at the second input 306 of the first comparator 302 is shown. At time t1, the magnitude (e.g., voltage level) of the adjusted input signal 404 is smaller than the magnitude of the upper limit voltage signal 402, designated as $V_{UL1}$. Therefore, as explained above, the output 310 of the first comparator 302 is at a high level, indicating a properly functioning probe. At time t2, the adjusted input signal 404 exceeds the upper limit voltage signal 402. In this state, the output 310 of the first comparator 302 goes low, indicating a probe failure condition and both the upper limit voltage signal 402 and the adjusted input signal 404 change in magnitude in accordance with Equations 1 and 2, respectively. As shown in FIG. 4, the upper limit voltage signal 402 drops from $V_{UL1}$ to $V_{UL2}$ while the adjusted input signal drops by an amount indicated by "A." The shift in the upper limit voltage from $V_{UL1}$ to $V_{UL2}$ volts represents a deadband around the upper limit voltage that provides a buffer against spurious voltage fluctuations of the adjusted input signal which may be caused by noise and/or interference signals, or glitches, in the circuitry, for example. In other words, given the conditions described above, voltage fluctuations of the adjusted input signal between $V_{UL1}$ to $V_{UL2}$ volts do not cause the output 310 of the first comparator to change.

One will appreciate that although both the upper limit voltage signal 402 and the adjusted input signal 404 drop in voltage levels, the first and second voltage divider resistors 308 and 322, respectively, are chosen such that the drop in voltage level of the adjusted input signal is smaller (preferably by a factor of two) than the drop in voltage level of the upper limit voltage signal 402. Therefore, the greater change in the upper limit voltage signal 402 still provides an upper limit voltage deadband around the upper limit voltage signal that produces a buffer zone against spurious fluctuations in the adjusted input signal when the magnitude of the adjusted input signal 404 is near the magnitude of the upper limit voltage signal 402. As explained in greater detail below with reference to FIG. 5, the change in the voltage level of the adjusted input signal as a result of the change in the output levels of the first and second comparators 302 and 312, respectively, provide the functionality of a lower deadband around the low reference voltage as the adjusted input signal crosses the lower limit voltage.

Between time t2 and t3, fluctuations of the adjusted input signal 404 above $V_{UL2}$ do not affect the output 310 of the first comparator 302. At time t3, the adjusted input signal 404 decreases below $V_{UL2}$ and, as described above, the output 310 of the first comparator 302 goes high and the upper limit voltage switches back to $V_{UL1}$ in accordance with Equation 1 above. Additionally, the adjusted input signal 404 increases in magnitude by an amount A in accordance with Equation 2 above. However, it is appreciated that the increase in magnitude of the adjusted input signal 404 indicated by A is smaller than the increase in the reference input from $V_{UL2}$ to $V_{UL1}$, preferably by a factor of two. Therefore, the shifting of the upper limit voltage 402 still provides a buffer zone in which the adjusted input signal 404 may fluctuate without causing a change in the output of the first comparator 302. This is illustrated in the time interval between time t3 and time t4, in which voltage fluctuations in the adjusted input signal 404 below $V_{UL1}$ do not affect the output 310 of the first comparator 302.

At time t4, the adjusted input signal 404 once again exceeds the upper limit signal 402, thereby causing the output of the first comparator 302 to go low. The magnitude of the upper limit voltage signal 402 and the adjusted input signal 404 shift downwardly as described above. Thus, the ability of the upper limit voltage signal to shift from $V_{UL1}$ to $V_{UL2}$ and vice versa, in response to the output 310 of the first comparator 302, provides a buffer zone, or deadband, around the high reference voltage such that small fluctuations in the adjusted input signal do not affect the operation of the first comparator 302. It is appreciated that this deadband around the high reference voltage provides stability and robustness against voltage fluctuations that may be caused by noise and/or interference signals, or glitches, in the circuitry, for example.

Referring once again to FIG. 3, a low reference voltage source (not shown) is connected to the series resistor 318 which is in turn electrically connected to the second input 316 of the second comparator 312. As previously described, the test signal is received at a first lead of the second voltage divider resistor 322 which is in turn electrically connected to the first input 314 of the second comparator. Although the low reference input voltage received at the second input 316 of the second comparator 312 remains essentially constant, the adjusted input signal ($V_A$) received at the first input 314 of the second comparator 312 varies primarily as a function of the output voltage ($V_R$) at the output 320 of the second comparator 312 in accordance with Equation 2. The variance of the adjusted input signal as a function of the output 320 provides a lower deadband that buffers fluctuations of the adjusted input signal near the low reference voltage. This concept is described in further detail below with reference to FIG. 5.

Figure 5:
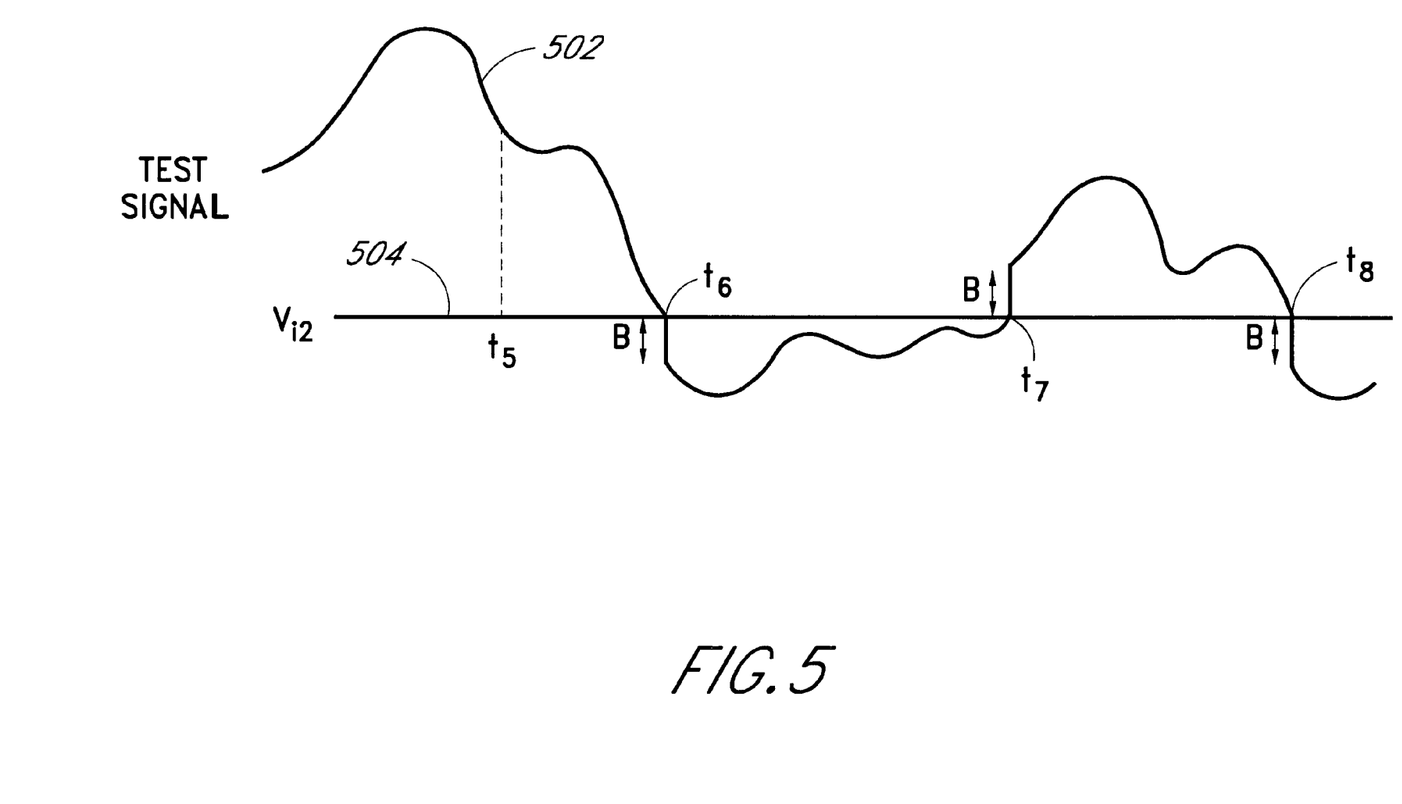
FIG. 5 is a signal diagram illustrating a low reference voltage signal and a test signal received by the probe failure detection circuit of FIG. 3, as the magnitude of the test signal changes with respect to the low reference voltage signal.

Referring to FIG. 5, an adjusted input signal 502 and a lower reference voltage signal 504 is illustrated. At time t5, the adjusted input signal 502 is above the lower reference voltage signal, which indicates that the probe under test is properly working. At time t6, the adjusted input signal begins to drop below the lower reference signal 504. At this point, the output 320 of the second comparator 312 goes low and the magnitude of the adjusted input signal 502 changes in accordance with Equation 2. This change in magnitude of the adjusted input signal 502 is shown as a downward shift by an amount indicated by "B" in FIG. 5. During the time interval between t6 and t7, the adjusted input signal 502 fluctuates below the low reference voltage signal. It is appreciated that the downward shift of the adjusted input signal 502 provides a buffer zone, corresponding to the amount of the downward shift B in which fluctuations of the adjusted input signal do not cross the voltage level of the low reference voltage signal.

At time t7, the adjusted input signal 502 begins to go above the low reference voltage and the adjusted input signal 502 shifts upwardly by an amount indicated by "B." This upward shift is caused by the change in the output 320 ($V_R$) of the second comparator 312 from a low state to a high state. The amount of the upward shift in the voltage level of the adjusted input signal 502 is governed by Equation 2. During the time interval between t7 and t8, the adjusted input signal 502 fluctuates above the low reference voltage signal 504. However, since the adjusted input signal has shifted upwardly by an amount B, these fluctuations do not cause the adjusted input signal 502 to cross below the low reference voltage and, therefore, do not affect the output 320 of the second comparator 302.

At time t8, the adjusted input signal 502 crosses below the low reference signal 504. At this time the output 320 of the second comparator 302 goes low and the adjusted input signal 502 once again shifts downwardly by an amount indicated by "B" which is determined by Equation 2. Thus, the ability of the adjusted input signal 502 to change in magnitude, or voltage level, in response to the output 320 of the second comparator creates a buffer zone around the low reference voltage that prevents spurious fluctuations in the signals received by the second comparator 312 from adversely affecting its output 320. This buffer zone essentially functions as a lower deadband around the lower limit voltage signal received at the second comparator 312. Although this lower deadband is created, not by shifting the voltage level of the low reference voltage 504 in response to the output 320 of the second comparator 312, but by shifting the voltage level of the adjusted input signal 502 in response to the output 320 of the second comparator 312, essentially the same effect is achieved. It is appreciated that this lower deadband provides stability and robustness against fluctuations in the adjusted input signal which may be caused by noise and/or interference signals, or glitches in the circuitry, for example.

Although specific implementations of creating deadbands around the high and low reference voltages have been described above, it is understood that the invention may incorporate any one of numerous methods and circuits for achieving this deadband effect. Such numerous method and circuits for creating a deadband around a reference voltage are well-known in the electronics art.

Referring again to FIG. 3, the outputs 310 and 320 of the first and second comparators, 302 and 312, respectively, are coupled to a first input 328 of a third comparator 330. The third comparator 330 includes a second input 332 which is connected to a voltage divider network comprising third and fourth voltage divider resistors 334 and 336, respectively. The third voltage divider resistor 334 includes a first lead which is connected to a third reference voltage source (indicated by 5 volts dc) and a second lead connected to a common node 338. A first lead of the fourth voltage divider resistor 336 is also connected to the common node 338. A second lead of the fourth voltage divider resistor 336 is connected to ground 340. The second input 332 of the third comparator 330 is connected to the common node 338. Therefore, the voltage received at the second input 332 of the third comparator 330 is governed by the following equation referred to herein as Equation 3:

$$V_{i3}=V_S \times [R_3/(R_3+R_4)] \qquad (Eq.\ 3)$$

where $V_{i3}$ is the input voltage at the second input 332 of the third comparator 330, $V_S$ is the source voltage connected to the third voltage divider resistor 334, $R_3$ is the resistance of the third voltage divider resistor 334, and $R_4$ is the resistance of the fourth voltage divider resistor 336. As illustrated in FIG. 3, in one embodiment, $R_3$ equal 100 k Ohms, $R_4$ equal 25 k Ohms and $V_S$ equals 5 Volts DC. Therefore, the voltage provided to the second input 332 of the third comparator 330 is approximately 1 Volt DC.

The third comparator 330 compares the voltage received at its first input 328 to the voltage received at its second input and outputs a voltage which depends on the results of this comparison. In one embodiment, the first input 328 is a negative input and the second input 332 is a positive input. Therefore, as described above, if a probe failure has occurred, the output of either the first or second comparator, 302 or 312, respectively, will be a logic-level low (e.g., 0.4 Volts). Thus, the voltage received at the first input 328 (the negative input) of the third comparator 330 is 0.4 Volts. Since the voltage level (1 Volt) received at the second input 332 (the positive input) of the third comparator 330 is greater than the voltage received at the first input 328, the output of the third comparator 330 is a logic-level high (e.g., 5 Volts).

When the output of the third comparator 330 is a logic-level high, it serves as an interrupt signal which is transmitted to the microcontroller 208 (FIG. 2). This interrupt signal indicates a probe failure has occurred. Upon receiving the interrupt signal from the third comparator 330, the microcontroller 208 will perform one or more specified actions, such as, designating the respective probe to be in a failure state, discarding data received from the probe, preventing the generation of an alarm which indicates a machine fault condition, preventing the shutdown of the machine coupled to the failed probe, etc. In this way, the probe failure detection circuit 206 prevents false alarms and unnecessary machine shutdowns. Additionally, since the probe failure detection circuit 206 is a separate circuit which is independent from the machine fault detection circuit 204 (FIG. 2), which processes the test signal to determine a machine fault condition, it does not delay nor add to the processing time of the machine fault detection circuit 204. Therefore, the probe failure detection circuit 206 may operate concurrently with the machine fault detection circuit 204 in processing a test signal. In one embodiment, the probe failure detection circuit 206 will typically process the test signal and determine whether there is a probe failure prior to the completion of processing the test signal by the machine fault detection circuit 204.

To verify the accuracy and "double check" the output of the third comparator 330, the probe failure detection circuit 206 further provides a redundancy verification signal ($V_R$) which is also received by the microcontroller 208 (FIG. 2). As shown in FIG. 3, the redundancy verification signal is generated at the outputs 310 and 320 of the first and second comparators 302 and 312, respectively. When a valid probe failure detection is made the interrupt signal will be a logic-level high signal and the redundancy verification signal will be a logic-level low signal. By providing both the interrupt signal and the redundancy verification signal, the probe failure detection circuit 206 affords a level of protection against spurious noise and/or interference signals which may otherwise falsely indicate a probe failure.

It is unlikely that random noise and/or interference signals would simultaneously affect both the interrupt signal outputted by the third comparator 330 and the redundancy verification signal provided at the outputs of the first and second comparators, 302 and 312 respectively, such that both signals simultaneously indicate a false probe failure condition. As mentioned above, in one embodiment the interrupt signal indicates a probe failure when it is at a logic-level high state and the redundancy verification signal indicates a probe failure when it is at a logic-level low state. By making these two signals have opposite states to indicate a valid probe failure condition, the probe failure detection circuit 206 further safeguards against false probe failure detections caused by simultaneous increases or decreases of both the interrupt signal and the redundancy signal due to noise and/or interference signals.

In one embodiment, after the test signal is received from the attenuation bandlimiting circuit 202 (FIG. 2), the resulting probe failure detection time to generate an interrupt signal is typically less than 1 ms. Further processing by the microcontroller 208 to perform relay actuation to control or prevent the shutdown of a machine and/or to disable the generation of a machine fault alarm is typically less than 5 ms. In this embodiment, the redundancy verification signal is also monitored by the microcontroller 208. The redundancy signal is sent directly to a general purpose I/O pin on the microcontroller 208, which reads the value of the redundancy signal no slower than once every 10 ms. Thus, as a worst case (which includes validating the interrupt signal), the invention exceeds the API 670 timing requirement of 100 ms, mentioned above, by a factor of ten. Thus, the amount of time associated with validating the probe data is no longer a factor in meeting the API 670 timing requirement mentioned above.

As described above, the invention provides a novel and improved method and system for processing and validating test data received from a probe that monitors a machine under test. By providing a probe failure detection circuit, or probe validation circuit, which is separate and independent of the circuitry which processes the test data to determine the operational status of the machine under test, the invention eliminates delays and inefficiencies associated with validating the data received from the probe.

As described above, the invention further provides a method and system for reliably detecting probe failures which is robust against the effects of noise, interference and/or glitches by providing deadbands around the upper and lower voltage limits which are compared to the test signals received from a test probe. In one embodiment, the probe failure detection circuit receives the test signal after a first stage of "conditioning" the test signal by an attenuation/bandlimiting circuit. Although this attenuation/bandlimiting circuit provides a first stage of eliminating noise and other interference signals effecting the test signal, the deadbands around the upper and lower limits provide further stability to the probe failure detection circuit against fluctuations in the test signal caused by noise and/or interference signals after the test signal has passed through the attenuation/bandlimiting circuit. Furthermore, in one embodiment, the invention provides added reliability in detecting a probe failure condition by providing a redundancy verification signal which is used to validate the interrupt signal. In this embodiment, a probe failure condition is detected only if both the redundancy verification signal and the interrupt signal are at defined levels.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A system for monitoring the operational condition of a machine, comprising:
    a test probe, capable of connecting to the machine, outputting a test signal representative of an operational parameter of the machine;
    a fault condition detection circuit receiving and processing the test signal so as to detect a fault condition of the machine; and
    a probe failure detection circuit receiving the test signal and detecting a failure condition of the test probe if the test signal is not within defined limits, wherein the probe failure detection circuit provides a data path that is separate from the fault condition detection circuit, wherein the probe failure detection circuit generates a redundancy signal if the test signal is not within the defined limits and generates an interrupt signal in response to the redundancy signal and wherein the probe failure condition is detected when the presence of both the redundancy signal and the interrupt signal is detected.

2. The system of claim 1, further comprising a processor connected to the fault condition detection circuit and the probe failure detection circuit, for initiating a defined action in response to signals received from the fault condition detection circuit and the probe failure detection circuit.

3. The system of claim 2, wherein the defined action is the generation of an alarm signal which indicates that a machine fault condition has been detected.

4. The system of claim 2, wherein the defined action is a shutdown of the machine.

5. The system of claim 2, wherein the processor periodically monitors the probe failure detection circuit for the presence of the redundancy signal.

6. The system of claim 1, wherein the probe failure detection circuit detects the failure condition of the test probe prior to the completion of processing the test signal by the fault condition detection circuit.

7. The system of claim 1, wherein the probe failure detection circuit comprises:
    a first comparator for comparing the test signal to a upper limit voltage signal received from a upper limit voltage source; and
    a second comparator for comparing the test signal to a low reference voltage signal received from a low reference voltage source.

8. The system of claim 7, wherein respective outputs of the first and second comparators are coupled to a first node such that the first and second comparators are configured to cooperatively provide a redundancy signal at the first node if the test signal is greater than the upper limit voltage or less than the low reference voltage, wherein the redundancy signal is monitored at defined periodic intervals.

9. The system of claim 8, further comprising a third comparator having a first input coupled to the first node for receiving the redundancy signal and a second input coupled to a third reference voltage source, wherein if the redundancy signal received at the first input is at a defined state with respect to the third reference voltage received at the second input, the third comparator outputs an interrupt signal and the probe failure is detected.

10. The system of claim 9, wherein the redundancy signal is a logic level low signal and the interrupt signal is a logic level high signal.

11. The system of claim 10, further comprising:
    a first feedback resistor having a first lead coupled to an output of the first comparator and a second lead coupled to a first input of the first comparator;
    a first voltage divider resistor having a first lead coupled to the first input of the first comparator and a second lead coupled to the upper limit voltage source, wherein the first feedback resistor and the first voltage divider resistor cooperate to provide a first deadband around the upper limit voltage;
    a second feedback resistor having a first lead coupled to an output of the second comparator and a second lead coupled to a first input of the second comparator; and
    a second voltage divider resistor having a first lead coupled to the first input of the second comparator and a second lead configured to receive the test signal wherein the second voltage divider resistor and the second feedback resistor cooperate to provide an adjusted input signal to the first input of the second comparator.

12. A system for monitoring the operational condition of a machine, comprising:
    probe means, configured to be coupled to the machine, for measuring an operational parameter of the machine and for outputting a test signal representative of the measured operational parameter;
    machine fault detection means, coupled to the probe means, for receiving and processing the test signal so as to detect a fault condition of the machine;
    probe failure detection means, coupled to the probe means, for receiving the test signal and detecting a failure condition of the probe means if the test signal is not within defined limits, wherein the probe failure detection means operates independently of the machine fault detection means, and wherein the probe failure detection means provides a redundancy signal and an interrupt signal wherein when the redundancy signal is at a first defined state and the interrupt signal is at a second defined state the failure condition of the test probe is detected; and processor means, coupled to the machine fault detection means and the probe failure detection means, for initiating a defined action in response to signals received from the machine fault detection means and the probe failure detection means.

13. The system of claim 12, wherein the defined action is the generation of an alarm signal which indicates that a machine fault condition has been detected.

14. The system of claim 12, wherein the defined action is a shutdown of the machine.

15. The system of claim 12, wherein the probe failure detection means detects the failure condition of the test probe prior to the completion of processing the test signal by the machine fault detection means.

16. The system of claim 12, wherein the redundancy signal is periodically monitored at defined intervals by the processor means.

17. The system of claim 12, wherein the probe failure detection means comprises:

a first comparing means for comparing the test signal to a upper limit voltage received from a upper limit voltage source; and a second comparing means for comparing the test signal to a low reference voltage received from a low reference voltage source, wherein if the test signal is greater than the upper limit voltage or less than the low reference voltage, the failure condition of the test probe is detected.

18. The system of claim 17, wherein the first and second comparing means are configured to output a redundancy signal which is monitored at defined periodic intervals by the processor means.

19. The system of claim 18, further comprising a third comparing means for receiving the redundancy signal and comparing the redundancy signal to a reference signal received from a third reference voltage source, and for outputting an interrupt signal in response to the redundancy signal.

20. The system of claim 19, wherein if the redundancy signal is at a logic level low and the interrupt signal is at a logic level high, the probe failure condition is detected.

21. The system of claim 20, further comprising:

a first feedback means, coupled to the first comparator means, for providing a first deadband around the high reference voltage such that fluctuations of the test signal within the first deadband do not affect an output of the first comparator means; and a second feedback means, coupled to the second comparator means, for providing a second deadband around the low reference voltage such that fluctuations of the test signal within the second deadband do not affect an output of the second comparator means.

22. A method of monitoring the operational condition of a machine, comprising:

measuring an operational parameter of the machine with a probe coupled to the machine;

outputting a test signal representative of the measured operational parameter;

providing the test signal to a machine fault detection circuit for processing;

determining whether the test signal indicates that a machine fault condition exists;

providing the test signal to a probe failure detection circuit;

determining whether the test signal indicates a probe failure condition exists, wherein the probe failure detection circuit operates independently of the machine fault detection circuit;

initiating a defined action if it is determined that a machine fault condition exists and a probe failure condition is not detected;

providing a redundancy signal responsive to the test signal; and providing an interrupt signal responsive to the redundancy signal wherein when the redundancy signal is at a first defined state and the interrupt signal is at a second defined state, the probe failure condition is detected.

23. The method of claim 22, wherein the defined action is the generation of an alarm signal which indicates that a machine fault condition has been detected.

24. The method of claim 22, wherein the defined action is a shutdown of the machine.

25. The method of claim 22, wherein the act of determining whether the test signal indicates a probe failure condition is completed prior to the completion of the act of determining whether the test signal indicates a machine fault condition.

26. The method of claim 22, further comprising periodically monitoring the redundancy signal at defined intervals.

27. The method of claim 21, wherein the act of determining whether the test signal indicates a probe failure condition exists comprises:

comparing the test signal to a upper limit voltage received from a upper limit voltage source; and comparing the test signal to a low reference voltage received from a low reference voltage source, wherein if the test signal is greater than the upper limit voltage or less than the low reference voltage, the failure condition of the test probe is detected.

28. The method of claim 27, further comprising:

outputting a redundancy signal if the test signal is greater than the upper limit voltage or less than the low reference voltage; and monitoring for the presence of the redundancy signal at defined periodic intervals.

29. The method of claim 28, further comprising:

comparing the redundancy signal with a third reference signal received from a third reference voltage source; and outputting an interrupt signal if the redundancy signal is at a defined state with respect to the third reference signal.

30. The method of claim 29, wherein if the redundancy signal is at a logic level low and the interrupt signal is at a logic level high, the probe failure condition is detected.

31. The method of claim 30, further comprising:

providing a first deadband around the upper limit voltage such that fluctuations of the test signal within the first deadband do not affect the act of outputting the redundancy signal; and providing a second deadband around the low reference voltage such that fluctuations of the test signal within the second deadband do not affect the act of outputting the redundancy signal.

* * * * *